US011538166B2

(12) United States Patent
Arani et al.

(10) Patent No.: US 11,538,166 B2
(45) Date of Patent: Dec. 27, 2022

(54) SEMANTIC SEGMENTATION ARCHITECTURE

(71) Applicant: NavInfo Europe B.V., Eindhoven (NL)

(72) Inventors: Elahe Arani, Eindhoven (NL); Shabbir Marzban, Eindhoven (NL); Andrei Pata, Eindhoven (NL); Bahram Zonooz, Eindhoven (NL)

(73) Assignee: NAVINFO EUROPE B.V., Eindhoven (NL)

( * ) Notice: Subject to any disclaimer, the term of this patent is extended or adjusted under 35 U.S.C. 154(b) by 9 days.

(21) Appl. No.: 17/107,283

(22) Filed: Nov. 30, 2020

(65) Prior Publication Data
US 2021/0166347 A1    Jun. 3, 2021

(30) Foreign Application Priority Data

Nov. 29, 2019  (NL) .................................... 2024344
Mar. 30, 2020  (NL) .................................... 2025236

(51) Int. Cl.
*G06T 7/11*        (2017.01)
*G06V 10/82*   (2022.01)
*G06N 3/08*      (2006.01)

(52) U.S. Cl.
CPC ............... *G06T 7/11* (2017.01); *G06V 10/82* (2022.01); *G06N 3/084* (2013.01); *G06T 2207/20016* (2013.01); *G06T 2207/20081* (2013.01); *G06T 2207/20084* (2013.01)

(58) Field of Classification Search
CPC .... G06N 3/02–088; G06T 2207/20081; G06T 2207/20084; G06T 7/10–194; G06T 2207/10004; G06V 10/82; G06K 9/6272
See application file for complete search history.

(56) References Cited

U.S. PATENT DOCUMENTS

2020/0074271 A1*   3/2020   Liang ...................... G06N 3/08
2020/0380695 A1* 12/2020   Zhou ...................... G06T 7/143
2021/0019562 A1*   1/2021   Yang ....................... G06N 3/08

OTHER PUBLICATIONS

Bilinski, Piotr, and Victor Prisacariu. "Dense Decoder Shortcut Connections for Single-Pass Semantic Segmentation." 2018 IEEE/CVF Conference on Computer Vision and Pattern Recognition. IEEE, 2018. (Year: 2018).*
Islam, Md Amirul, et al. "Label refinement network for coarse-to-fine semantic segmentation." arXiv preprint arXiv:1703.00551v1 (2017). (Year: 2017).*
Liu, Yahui, et al. "Learning to refine object contours with a top-down fully convolutional encoder-decoder network." arXiv preprint arXiv:1705.04456v1 (2017). (Year: 2017).*

(Continued)

*Primary Examiner* — Geoffrey E Summers
(74) *Attorney, Agent, or Firm* — Peacock Law P.C.; Justin R. Muehlmeyer

(57) ABSTRACT

A semantic segmentation architecture comprising an asymmetric encoder-decoder structure, wherein the architecture comprises further an adapter for linking different stages of the encoder and the decoder. The adapter amalgamates information from both the encoder and the decoder for preserving and refining information between multiple levels of the encoder and decoder. In this way the adapter aggregates features from different levels and intermediates between encoder and decoder.

3 Claims, 5 Drawing Sheets

(56) References Cited

OTHER PUBLICATIONS

Tian, Zhi, et al. "Decoders Matter for Semantic Segmentation: Data-Dependent Decoding Enables Flexible Feature Aggregation." arXiv preprint arXiv:1903.02120v3 (2019). (Year: 2019).*

Si, Haiyang, et al. "Real-time semantic segmentation via multiply spatial fusion network." arXiv preprint arXiv:1911.07217v1 (2019). (Year: 2019).*

Badrinarayanan, Vijay, et al., "SegNet: A Deep Convolutional Encoder-Decoder Architecture for Image Segmentation", IEEE Transactions on Pattern Analysis and Machine Intelligence, vol. 39, No. 12, 2017, 2481-2495.

Chao, Ping, et al., "HarDNet: A Low Memory Traffic Network", Arxiv.org, Cornell University Library, 201 Olin Library Cornell University Ithica, NY, 2019, 1-10.

Chaurasia, Abhishek, et al., "LinkNet: Eploiting Encoder Representations for Efficient Semantic Segmentation", Arxiv.org, Cornell University Library, 201 Olin Library Cornell University Ithica, NY, 2019, 1-5.

Chen, Liang-Chieh, et al., "DeepLab: Semantic Image Segmentation with Deep Convolutional Nets, Atrous Convolution, and Fully Connected CRFs", Arxiv.org, Cornell University Library, 201 Olin Library Cornell University Ithica, NY, 2016, 1-14.

Chen, Liang-Chieh, et al., "Encoder-Decoder with Atrous Separable Convolution for Semantic Image Segmentation", Arxiv.org, Cornell University Library, 201 Olin Library Cornell University Ithica, NY, 2018, 1-18.

Chen, Xueying, et al., "Feature Fusion Encoder Decoder Network for Automatic Liver Lesion Segmentation", IEEE 16th International Symposium on Biomedical Imaging, 2019, 430-433.

Chen, Liang-Chieh, et al., "Rethinking Atrous Convolution for Semantic Image Segmentation", Arxiv.org, Cornell University Library, 201 Olin Library Cornell University Ithica, NY, 2017, 1-14.

Chen, Liang-Chieh, et al., "Semantic Image Segmentation with Deep Convolutional Nets and Fully Connected CRFs", Published as a conference paper at ICLR, 2015, 1-14.

Ding, Henghui, et al., "Context Contrasted Feature and Gated Multi-scale Aggregation for Scene Segmentation", 2018 IEEE/CVF Conference on Computer Vision and Pattern Recognition, Salt Lake City, UT, 2018, 2393-2402.

Dong, Xiaomeng, et al., "FastEstimator: A Deep Learning Library for Fast Prototyping and Productization", Arxiv.org, Cornell University Library, 201 Olin Library Cornell University Ithica, NY, 2019, 1-8.

Fu, Jun, "Dual Attention Network for Scene Segmentation", Arxiv.org, Cornell University Library, 201 Olin Library Cornell University Ithica, NY, 2018, 1-10.

Fu, Jun, "Stacked Deconvolutional Network for Semantic Segmentation", Arxiv.org, Cornell University Library, 201 Olin Library Cornell University Ithica, NY, 2017, 1-12.

Girshick, Ross, et al., "Fast R-CNN", Arxiv.org, Cornell University Library, 201 Olin Library Cornell University Ithica, NY, 2015, 1-9.

He, Kaiming, et al., "Deep Residual Learning for Image Recognition", Arxiv.org, Cornell University Library, 201 Olin Library Cornell University Ithica, NY, 2015, 1-12.

Krizhevsky, Alex, et al., "ImageNet Classification with Deep Convolutional Neural Networks", Part of Advances in Neural Information Processing Systems 25(2)(NIPS 2012), 2012, 1-9.

Lan, Xu, et al., "Person Search by Multi-Scale Matching", Arxiv.org, Cornell University Library, 201 Olin Library Cornell University Ithica, NY, 2018, 1-18.

Li, Jie, et al., "Learning to Fuse Things and Stuff", Arxiv.org, Cornell University Library, 201 Olin Library Cornell University Ithica, NY, 2019, 1-13.

Li, Wei, et al., "Person Re-Identification by Deep Joint Learning of Multi-Loss Classification", Proceedings of the Twenty-Sixth International Joint Conference on Artificial Intelligence (IJCAI-17), 2017, 2194-2200.

Long, Jonathan, et al., "Fully Convolutional Networks for Semantic Segmentation", Arxiv.org, Cornell University Library, 201 Olin Library Cornell University Ithica, NY, 2014, 1-10.

Milioto, Andres, "Real-time Semantic Segmentation of Crop and Weed for Precision Agriculture Robots Leveraging Background Knowledge in CNNs", Arxiv.org, Cornell University Library, 201 Olin Library Cornell University Ithica, NY, 2018, 1-7.

Paszke, Adam, et al., "ENet: A Deep Neural Network Architecture for Real-Time Semantic Segmentation", Arxiv.org, Cornell University Library, 201 Olin Library Cornell University Ithica, NY, 2016, 1-10.

Pohlen, Tobias, et al., "Full-Resolution Residual Networks for Semantic Segmentation in Street Scenes", Arxiv.org, Cornell University Library, 201 Olin Library Cornell University Ithica, NY, 2016, 1-12.

Poudel, Rudra Pk, et al., "Fast-SCNN: Fast Semantic Segmentation Network", Arxiv.org, Cornell University Library, 201 Olin Library Cornell University Ithica, NY, 2019, 1-9.

Qi, Gege, et al., "Self-Learned Feature Reconstruction and Offset-Dilated Feature Fusion for Real-Time Semantic Segmentation", IEEE 31st International Conference on Tools with Artificial Intelligence (ICTAI), 2019, 331-338.

Ren, Xutong, et al., "Generalized Coarse-to-Fine Visual Recognition with Progressive Training", Arxiv.org, Cornell University Library, 201 Olin Library Cornell University Ithica, NY, 2018, 1-10.

Ronneberger, Olaf, et al., "U-Net: Convolutional Networks for Biomedical Image Segmentation", Arxiv.org, Cornell University Library, 201 Olin Library Cornell University Ithica, NY, 2015, 1-8.

Salehi, Seyed Sadegh Mohseni, et al., "Real-Time Automatic Fetal Brain Extraction in Fetal MRI by Deep Learning", Arxiv.org, Cornell University Library, 201 Olin Library Cornell University Ithica, NY, 2017, 1-5.

Simonyan, Karen, et al., "Very Deep Convolutional Networks for Large-Scale Image Recognition", Published as a conference paper at ICLR 2015, 2015, 1-14.

Su, Yun-Hsuan, et al., "Real-time vision-based surgical tool segmentation with robot kinematics prior", 2018 International Symposium on Medical Robotics (ISMR), Atlanta, GA, 2018, 2018, 1-6.

Sun, Shuyang, et al., "FishNet: A Versatile Backbone for Image, Region, and Pixel Level Prediction", Arxiv.org, Cornell University Library, 201 Olin Library Cornell University Ithica, NY, 2019, 1-11.

Sun, Ke, et al., "High-Resolution Representations for Labeling Pixels and Regions", Arxiv.org, Cornell University Library, 201 Olin Library Cornell University Ithica, NY, 2019, 1-13.

Szegedy, Christian, et al., "Going deeper with convolutions", Arxiv.org, Cornell University Library, 201 Olin Library Cornell University Ithica, NY, 2014, 1-12.

Valada, Abhinav, et al., "Dynamic Model Adaptation for Multimodal Semantic Segmentation", Arxiv.org, Cornell University Library, 201 Olin Library Cornell University Ithica, NY, 2018, 1-43.

Wang, Xiaolong, et al., "Non-local Neural Networks", Arxiv.org, Cornell University Library, 201 Olin Library Cornell University Ithica, NY, 2018, 1-10.

Wu, Zifeng, et al., "Wider and Deeper: Revisiting the ResNet Model for Visual Recognition", Arxiv.org, Cornell University Library, 201 Olin Library Cornell University Ithica, NY, 2016, 1-19.

Yu, Changqian, et al., "BiSeNet: Bilateral Segmentation Network for Real-time Semantic Segmentation", Arxiv.org, Cornell University Library, 201 Olin Library Cornell University Ithica, NY, 2018, 1-17.

Yuan, Yuhui, et al., "OCNet: Object Contect Network for Scene Parsing", Arxiv.org, Cornell University Library, 201 Olin Library Cornell University Ithica, NY, 2019, 1-9.

Zhao, Hengshuang, et al., "ICNet for Real-Time Semantic Segmentation on High-Resolution Images", Arxiv.org, Cornell University Library, 201 Olin Library Cornell University Ithica, NY, 2018, 1-16.

Zhao, Hengshuang, et al., "PSANet: Point-wise Spatial Attention Network for Scene Parsing", European Conference on Computer Vision (ECCV), 2018, 2018, 1-17.

Zhao, Hengshuang, et al., "Pyramid Scene Parsing Network", Arxiv.org, Cornell University Library, 201 Olin Library Cornell University Ithica, NY, 2017, 1-11.

(56) References Cited

OTHER PUBLICATIONS

Zhu, Yi, et al., "Improving Semantic Segmentation via Video Propagation and Label Relaxation", Arxiv.org, Cornell University Library, 201 Olin Library Cornell University Ithica, NY, 2019, 1-13.

Zhuang, Juntang, et al., "ShelfNet for Fast Semantic Segmentation", Arxiv.org, Cornell University Library, 201 Olin Library Cornell University Ithica, NY, 2019, 1-10.

\* cited by examiner

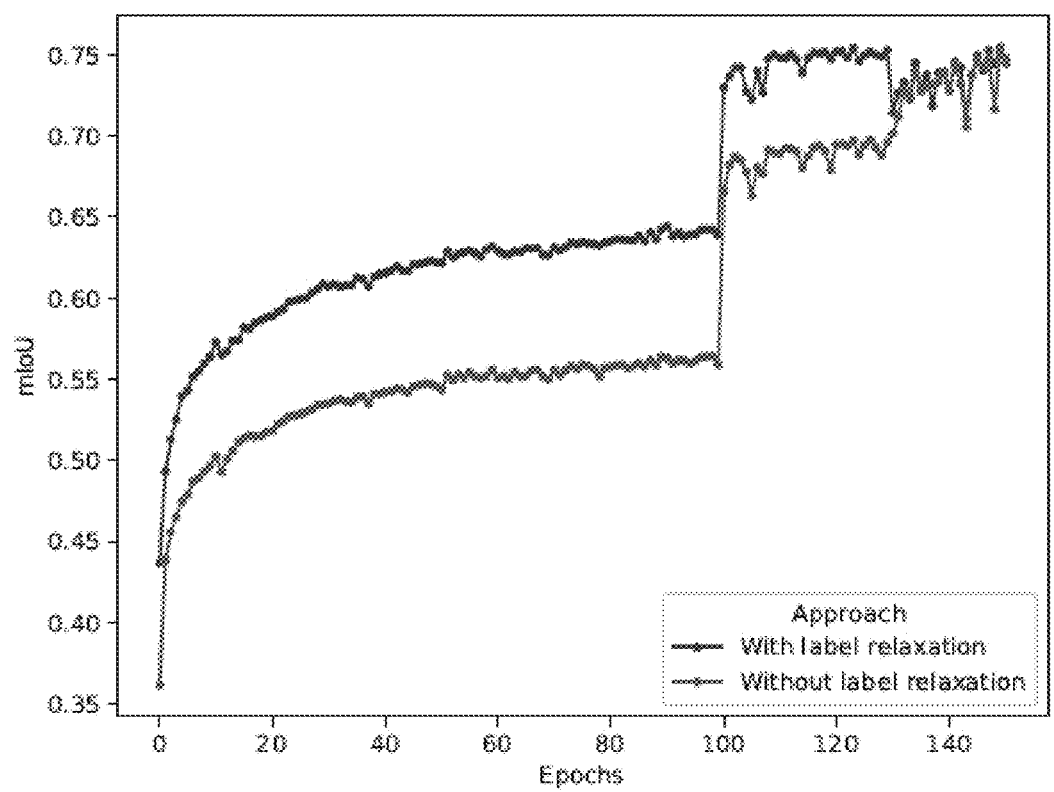
Fig. 5A (a) Validation mIoU
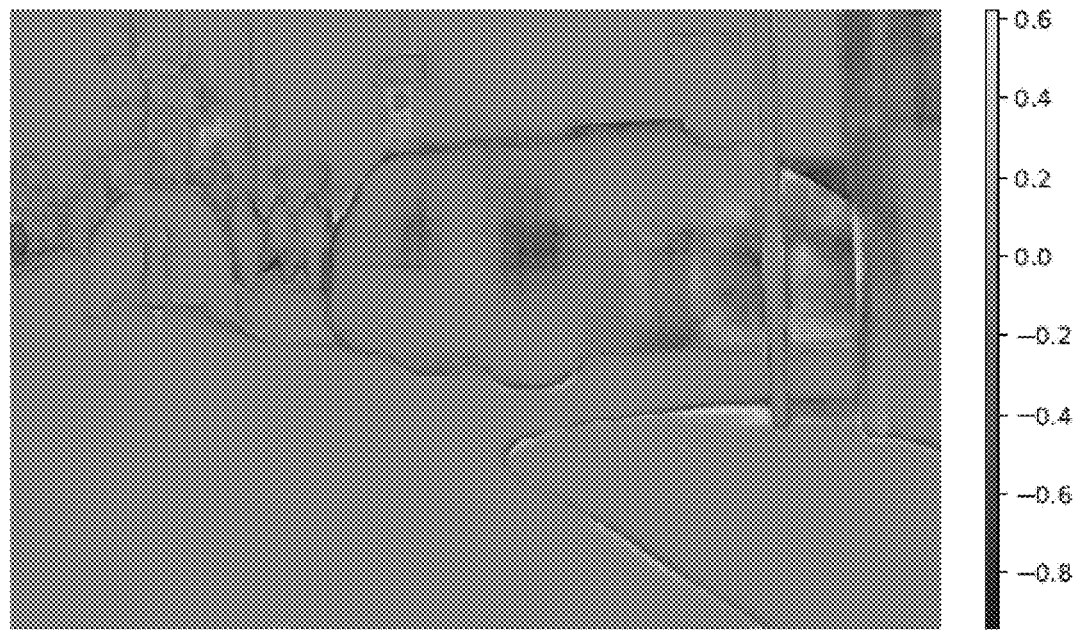
Fig. 5B (b) Diffemce of Entropy

SEMANTIC SEGMENTATION ARCHITECTURE

CROSS-REFERENCE TO RELATED APPLICATIONS

This application claims priority to Netherlands Patent Application No. 2024344, titled "A Semantic Segmentation Architecture", filed on Nov. 29, 2019, and Netherlands Patent Application No. 2025236, titled "A Semantic Segmentation Architecture", filed on Mar. 30, 2020, and the specification and claims thereof are incorporated herein by reference.

BACKGROUND OF THE INVENTION

Field of the Invention

Embodiments of the present invention relate to a semantic segmentation architecture comprising an asymmetric encoder-decoder structure.

Embodiments of the present invention further relate to a method of progressive resizing as used in segmentation to reduce training time.

Background Art

Embodiments of the present invention relate to a convolutional neural network architecture. Convolutional neural networks (CNNs) have brought about a paradigm shift in the field of computer vision, leading to tremendous advances in many tasks [see lit. 10, 11, 13, 14, 16, 25, 29].

Semantic segmentation, which associates each pixel to an object class it belongs to, is a computationally expensive task in computer vision [see lit. 17]. Fast semantic segmentation is broadly applied to several real-time applications including autonomous driving, medical imaging and robotics [see lit. 18, 19, 24, 26]. Accurate CNN-based semantic segmentation requires larger neural networks with deeper and wider layers. These larger networks are therefore not suitable for edge computing devices as they are cumbersome and require substantial resources.

Down-sampling operations, such as pooling and convolutions with stride greater than one, can help decrease the latency of deeper neural networks, however they result in decreased pixel-level accuracy due to the lower resolutions at deeper levels. Many recent approaches employ either encoder-decoder structure [see lit. 1, 23, 28], a two or multi-branch architecture [see lit. 21, 31, 33] or dilated convolutions [see lit. 3-5, 34] to recover spatial information. While these real-time architectures perform appropriately on simple datasets, their performance is sub-optimal for complex datasets possessing more variability in terms of classes, sizes, and shapes. Thus, there is a significant interest in designing CNN architectures that can perform well on complex datasets and, at the same time, are mobile enough to be of practical use in real-time applications.

BRIEF SUMMARY OF THE INVENTION

One of the objectives of embodiments of the present invention is to provide a practical solution which works in real time situations.

The semantic segmentation architecture of the invention which is based on an asymmetric encoder-decoder structure, has the features of one or more of the appended claims.

First and primarily the architecture comprises an adapter for linking different stages of the encoder and the decoder. The adaptor utilizes features at different abstraction levels from both the encoder and decoder to improve the feature refinement at a given level allowing the network to preserve deeper level features with higher spatial resolution Furthermore, the adaptor enables a better gradient flow from deeper layers to shallower layers by adding shorter paths. While training, gradients of loss with respect to weights are calculated in a backward propagation progression starting from outer most layers to inner layers of convolutional neural networks following a path. This propagation can be termed as gradient flow. The reference to 'better gradient flow' means the flow of gradient is more direct with shorter paths.

A feature of the semantic segmentation architecture of the invention is therefore that the adapter amalgamates information from both the encoder and the decoder for preserving and refining information between multiple levels of the encoder and decoder.

More specifically the adapter aggregates features from three different levels and intermediates between encoder and decoder. On a mathematical level the function of the adapter can be expressed as $$x^a_s = D(T(x^e_{s-1})) + T(x^e_s) + U(x^d_{s+1})$$

where superscripts a, e, and d denote adaptor, encoder, and decoder respectively, s represents the spatial level in the network, $D(:)$ and $U(:)$ are downsampling and upsampling functions, and $T(:)$ is a transfer function that reduces the number of output channels from an encoder block and transfers them to the adaptor.

The invention is also directed to a method of progressive resizing as used in segmentation of images to reduce training time, wherein the training starts with initial image sizes followed by a progressive increase of said sizes until a final stage of training is conducted using the original image sizes, applying label relaxation of borders in the images. In the invention first one-hot labels are created from a label map followed by a max-pool operation with stride 1. This effectively dilates each one-hot label channel transforming it into multi-hot labels along the borders which can then be used to find union of labels along the border pixels.

BRIEF DESCRIPTION OF THE SEVERAL VIEWS OF THE DRAWINGS

The accompanying drawings, which are incorporated into and form a part of the specification, illustrate one or more embodiments of the present invention and, together with the description, serve to explain the principles of the invention. The drawings are only for the purpose of illustrating one or more embodiments of the invention and are not to be construed as limiting the invention. In the drawings:

FIGS. 5A and 5B show training profiles of progressive resizing with and without label relaxation according to an embodiment of the present invention.

DETAILED DESCRIPTION OF THE INVENTION

Figure 1:
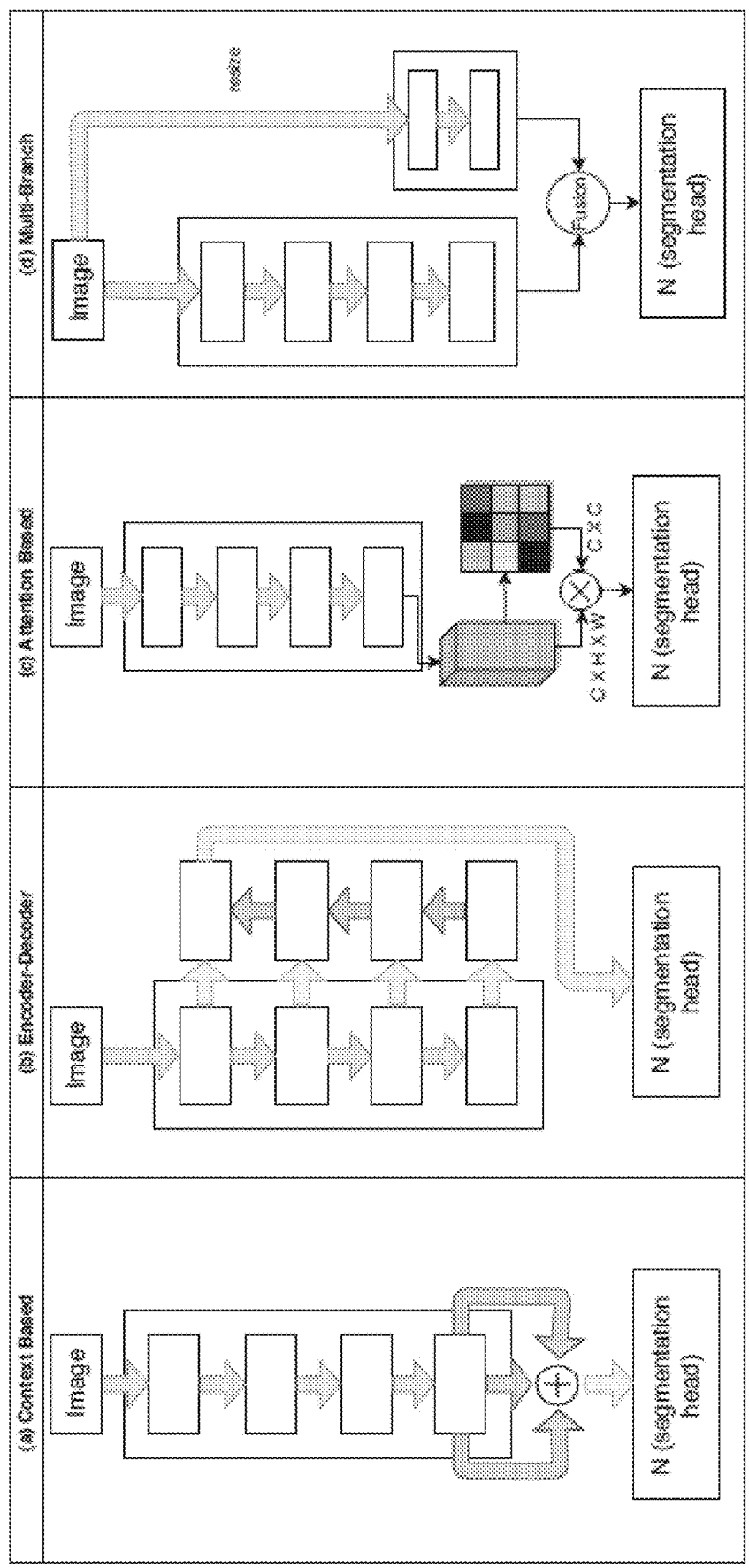
FIG. 1 shows some schematic illustrations of prior art semantic segmentation architectures.

Whenever in the figures the same reference numerals are applied, these numerals refer to the same parts.

Whenever in the following reference is made to RGPNet, this refers to the architecture according to the invention.

FIG. 1 shows different semantic segmentation architectures, notably:

(a) In context-based networks, dilated convolutions with multiple dilation rates are employed in cascade or in parallel to capture a multi-scale context. To capture the contextual information at multiple scales, DeepLabV2 [lit. 3] and DeeplabV3 [lit. 4] exploit multiple parallel atrous convolutions with different dilation rates, while PSPNet [lit. 34] performs multi-scale spatial pooling operations. Although these methods encode rich contextual information, they cannot capture boundary details effectively due to strided convolution or pooling operations [lit. 6].

(b) In encoder-decoder networks, an encoder extracts the features of high-level semantic meaning and a decoder densifies the features learned by the encoder. Several studies entail encoder-decoder structure [lit. 1, 7, 9, 15, 20, 23, 37]. The encoder extracts global contextual information and the decoder recovers the spatial information. Deeplabv3+[lit. 6] utilizes an encoder to extract rich contextual information in conjunction with a decoder to retrieve the missing object boundary details. However, implementation of dilated convolution at higher dilation rates is computationally intensive making them as yet unsuitable for real-time applications.

(c) In attention-based networks, the feature at each position is selectively aggregated by a weighted sum of the features at all positions. This can be done across channels or spatial dimensions. Attention mechanisms, which help networks to focus on relevant information and ignore the irrelevant information, have been widely used in different tasks, and gained popularity to boost the performance of semantic segmentation. Wang et al. [lit. 30] formalized self-attention by calculating the correlation matrix between each spatial point in the feature maps in video sequences. To capture contextual information, DaNet [lit. 8] and OCNet [lit. 32] apply a self-attention mechanism. DaNet has dual attention modules on position and channels to integrate local features with their respective global dependencies. OCNet, on the other hand, employs the self-attention mechanism to learn the object context map recording the similarities between all the pixels and the associated pixel. PSANet [lit. 35] learns to aggregate contextual information for each individual position via a predicted attention map. Attention based models, however, generally require expensive computation.

(d) Multi-branch networks are employed to combine semantic segmentation results at multiple resolution levels. The lower resolution branches yield deeper features with reduced resolution and the higher resolution branches learn spatial details. Another approach to preserve the spatial information is to employ two- or multi-branch approach. The deeper branches extract the contextual information by enlarging receptive fields and shallower branches retain the spatial details. The parallel structure of these networks make them suitable for run time efficient implementations [lit. 22, 31, 33]. However, they are mostly applicable to the relatively simpler datasets with fewer number of classes. On the other end, HRNet [lit. 27] proposed a model with fully connected links between output maps of different resolutions. This allows the network to generalize better due to multiple paths, acting as ensembles. However, without reduction of spatial dimensions of features, the computational overhead is very high and makes the model no longer feasible for real-time usage.

Figure 2:
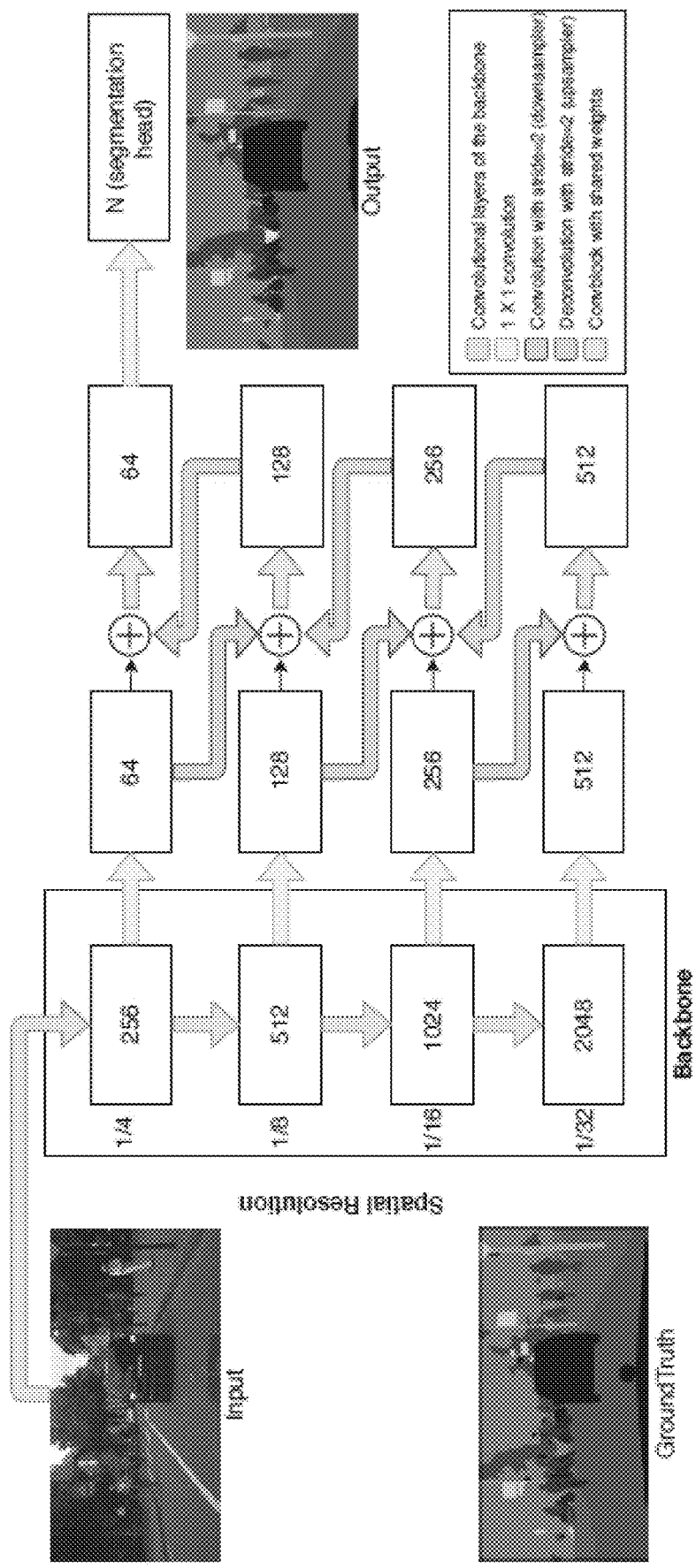
FIG. 2 shows a schematic illustration of the semantic segmentation architecture according to an embodiment of the present invention.

FIG. 2 depicts the architecture of an embodiment of the invention. Rectangular boxes depict a tensor at a given level with the number of channels mentioned as their labels. The arrows represent the convolution operations indicated by the legend.

Figure 3:
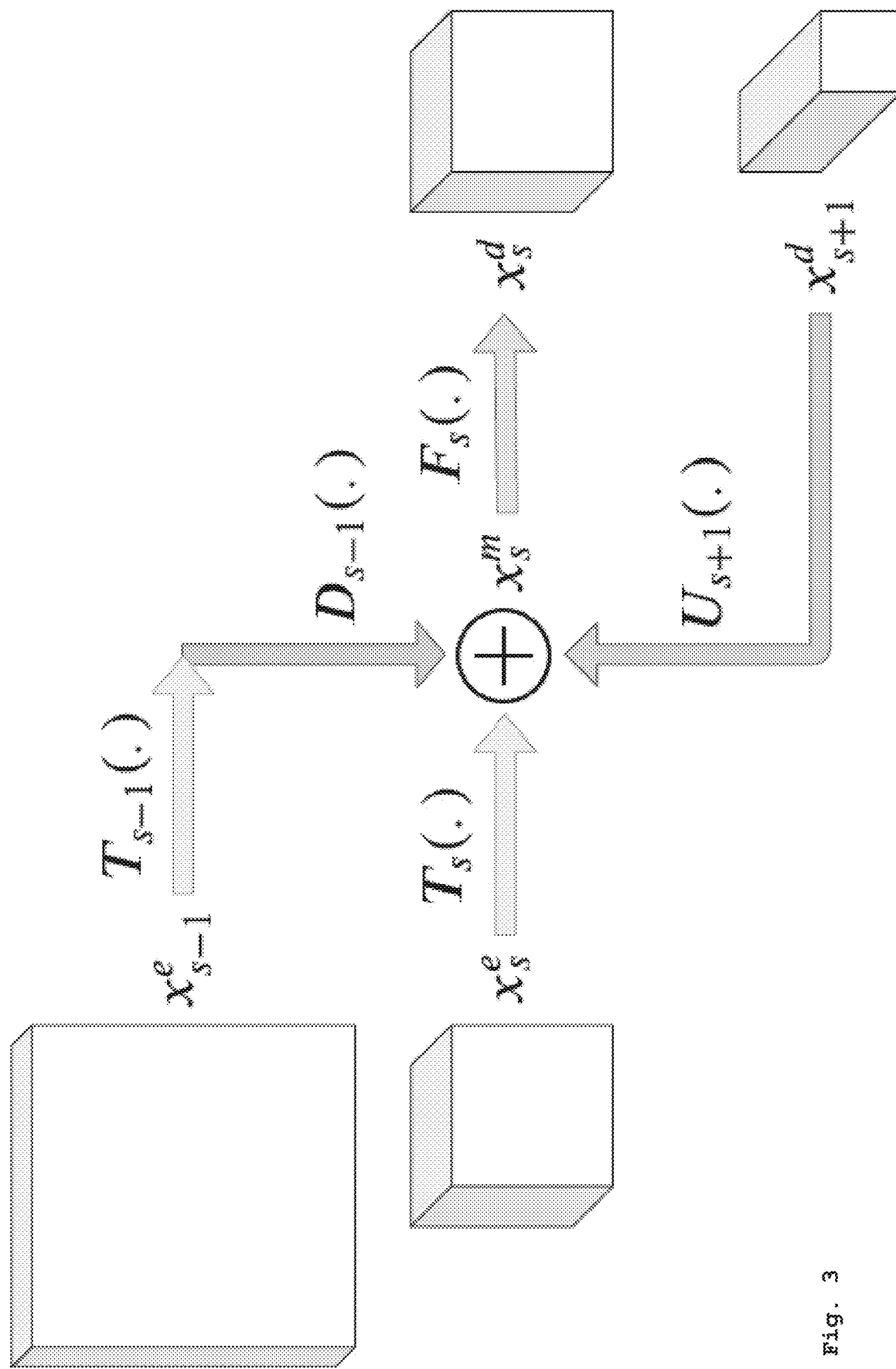
FIG. 3 shows the architecture of the adapter module according to an embodiment of the present invention.

FIG. 3 depicts the operation of a single adapter module at a level in the midst of the decoder and encoder. The adaptor fuses information from multiple abstraction levels; $T(:)$, $D(:)$, and $U(:)$ denote the transfer, downsampling and upsampling functions, respectively. $F(:)$ is the decoder block with shared weights between layers.

As is shown in FIG. 2 and FIG. 3, the architecture of the invention is based on a light-weight asymmetric encoder-decoder structure for fast and efficient inference. It comprises three components: an encoder which extracts high-level semantic features, a light asymmetric decoder, and an adaptor which links different stages of encoder and decoder. The encoder decreases the resolution and increases the number of feature maps in the deeper layers, thus it extracts more abstract features in deeper layers with enlarged receptive fields.

The decoder reconstructs the lost spatial information. The adaptor amalgamates the information from both encoder and decoder allowing the network to preserve and refine the information between multiple levels. With particular reference to FIG. 2, in a given row of the diagram, all the tensors have the same spatial resolution with the number of channels mentioned in the scheme.

Four level outputs from the encoder are extracted at different spatial resolutions $1=4$, $1=8$, $1=16$ and $1=32$ with 256, 512, 1024 and 2048 channels, respectively. The number of channels are reduced by a factor of four using 1×1 convolutions followed by batch norm and ReLU activation function at each level. These outputs are then passed through a decoder structure with the adaptor in the middle. Finally, a segmentation output is extracted from the largest resolution via 1×1 convolution to match the number of channels to segmentation categories.

The adaptor acts as a feature refinement module. The presence of an adaptor precludes the need of a symmetrical encoder-decoder structure. It aggregates the features from three different levels, and intermediates between encoder and decoder as is shown in FIG. 3. The adaptor function is defined as:

$$x^a_s = D(T(x^e_{s-1})) + T(x^e_s) + U(x^d_{s+1}) \quad (1)$$

where superscripts a, e, and d denote adaptor, encoder, and decoder respectively, s represents the spatial level in the network. $D(:)$ and $U(:)$ are downsampling and upsampling functions. Downsampling is carried out by convolution with stride 2 and upsampling is carried out by deconvolution with stride 2 matching spatial resolution as well as the number of channels in the current level. $T(:)$ is a transfer function that reduces the number of output channels from an encoder block and transfers them to the adaptor:

$$T(x^e_s) = \sigma(\omega^a_s \otimes x^e_s + b^a_s) \quad (2)$$

where ω and b are the weight matrix and bias vector, denotes the convolution operation, and ⊗ denotes the activation function. The decoder contains a modified basic residual block, F, where we use shared weights within the block. The decoder function is as follows:

$$x^d_s = F(x^m_s; \omega^d_s) \quad (3)$$

The adaptor has a number of advantages. First, the adaptor aggregates features from different contextual and spatial levels. Second, it facilitates the flow of gradients from deeper layers to shallower layers by introducing a shorter path. Third, the adaptor allows for utilizing asymmetric design with a light-weight decoder. This results in fewer convolution layers, further boosting the flow of gradients. The adaptor, therefore, makes the network suitable for real-time applications as it provides rich semantic information while preserving the spatial information.

Progressive Resizing with Label Relaxations

As mentioned above, the invention is also directed to a method of progressive resizing as used in segmentation to reduce training time. Conventionally the training starts with smaller image sizes followed by a progressive increase of size until the final stage of the training is conducted using the original image size. For instance, this technique can theoretically speed up the training time by 16 times per epoch if the image dimensions are decreased by ¼ and correspondingly the batch size is increased by a factor of 16 in a single iteration. However, reducing the image size using nearest neighbour interpolation (bi-linear or bi-cubic interpolation are not applicable), introduces noise around the borders of the objects due to aliasing. Note that inaccurate labelling is another source of noise. To reduce effects of boundary artifacts in progressive resizing, the invention applies an optimized variant of label relaxation method [lit 36].

In label relaxation along the borders, instead of maximizing likelihood of a target label, likelihood of union of neighbouring pixel labels is maximized. In the invention, first one-hot labels are created from the label map followed by max-pool operation with stride 1. This effectively dilates each one-hot label channel transforming it into multi-hot labels along the borders which can then be used to find union of labels along the border pixels.

The kernel size of the max pooling controls the width containing pixels being treated as border pixels along the borders. Loss at a given border pixel can be calculated as follows where N is set of border labels:

$$L_{boundary} = -\log \Sigma_{C \in N}(P(C)) \quad (4)$$

Figure 4:
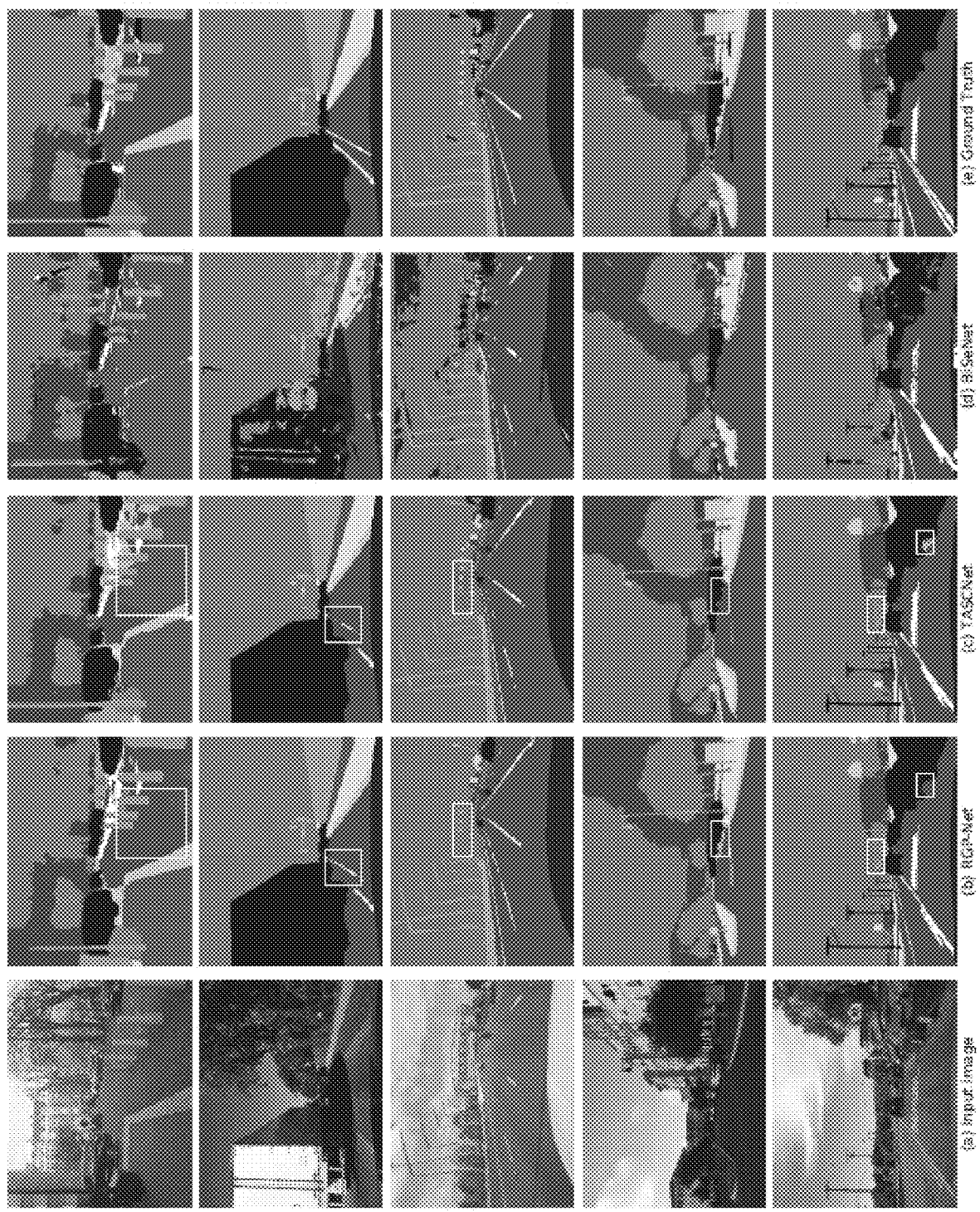
FIG. 4 shows semantic segmentation results on a Mapillary Vistas validation set according to an embodiment of the present invention.

FIG. 4 depicts some qualitative results obtained by the model of the invention compared to TASCNet and BiSeNet on a Mapillary Vistas validation set. The Mapillary Vistas validation set consists of 20,000 high-resolution street-level images taken from many different locations around the globe and under varying conditions annotated for 65 categories. The dataset is split up in a training set of 18,000 images and a validation set of 2,000 images.

The columns correspond to input image, the output of RGPNet, the output of TASCNet [lit. 15], the output of BiSeNet [lit. 31], and the ground-truth annotation. For all methods R101 is used as the backbone. RGPNet mainly improves the results on road and road-related objects' pixels.

Experimental Results RGPNet

In this section, overall performance of RGPNet is evaluated and compared with other real-time semantic segmentation methods (BiSeNet [lit. 31], TASCNet [lit. 15], and ShelfNet [lit. 37]) on the Mapillary validation set. Different feature extractor backbones ResNet [lit. 12] (R101, R50 and R18), Wide-Resnet [lit. 38] (WRN38), and HarDNet [lit. 2] (HarDNet39D) are used.

TABLE 1

Mapillary Vistas validation set results. The experiments are conducted using 16-bit floating point (FP16) numbers.

| Model (backbone) | FPS | mIoU(%) | Params(M) |
|---|---|---|---|
| BiSeNet(R101) | 15.5 | 20.4 | 50.1 |
| TASCNet(R50) | 17.6 | 46.4 | 32.8 |
| TASCNet(R101) | 13.9 | 48.8 | 51.8 |
| ShelfNet(R101) | 14.8 | 49.2 | 57.7 |
| RGPNet(R101) | 18.2 | 50.2 | 52.2 |
| RGPNetB(WRN38) | 5.72 | 53.1 | 215 |
| RGPNet(HarDNet39D) | 46.6 | 42.5 | 9.4 |
| RGPNet(R18) | 54.4 | 41.7 | 17.8 |

Table 1 compares speed (FPS), mIoU and number of parameters on these methods on 16-bit precision computation.

RGPNet(R101) achieves 50:2% mIoU which outperforms TASCNet and ShelfNet with a significant margin and lower latency. Although RGPNet(R101) has more parameters than the TASCNet(R101), both speed and mIoU are considerably higher. However, BiSeNet demonstrates poor performance on Mapillary resulting in the lowest mIoU. The method of the invention also achieves impressive results with a lighter encoder (R18 or HarDNet39D) surpassing BiSeNet with a heavy backbone (R101) significantly, 41:7% vs 20:4% mIoU and 54.4 vs 15.5 FPS.

Validation Progressive Resizing with Label Relaxation

In order to validate the gain from label relaxation, the result of progressive resizing training is compared with and without label relaxation. In these experiments for the first 100 epochs, the input images are resized by a factor of ¼ both in width and height. At the 100th epoch, the image resize factor is set to ½ and, at the 130th epoch, full-sized images are used. With label relaxation, it is observed that the model achieves higher mIoU especially at lower resolutions.

To further analyze the effect of label relaxation in progressive resizing technique, the difference in entropy is illustrated between two setups (progressive resizing with and without label relaxation). FIG. 5 shows that the model trained with label relaxation is more confident in the predictions around the object boundaries.

FIG. 5A shows that training profiles of progressive resizing with (red) and without (green) label relaxation experiments conducted on a Cityscapes validation set. Cityscapes contains diverse street level images from 50 different city across Germany and France. It contains 30 classes and only 19 classes of them are used for semantic segmentation evaluation. The dataset contains 5000 high quality pixel-level finely annotated images and 20000 coarsely annotated images. The finely annotated 5000 images are divided into 2975=500=1525 image sets for training, validation and testing.

Specially at lower resolutions, label relaxation helps in achieving a higher mIoU.

FIG. 5B depicts a heatmap of difference in entropy between label relaxation and without label relaxation based trained model evaluated on a sample image from validation set. On boundaries of objects, models trained with label relaxation are more confident about the label and hence have lower entropy (blue shades).

The method of progressive resizing with label relaxation according to the invention also has beneficial energy implications as shown in table 2 below.

TABLE 2

| Progressive resizing result on energy efficiency | | | |
|---|---|---|---|
| Training scheme | Energy (kJ) | time | mIoU(%) |
| Progressive resizing | 212 | 31 m. 43 s. | 78.8 |
| Full-scale | 873 | 108 m. 44 s. | 80.9 |

Table 2 shows that the training time reduced from 109 minutes to 32 minutes, close to the speedup expected from theoretical calculation. The energy consumed by GPU decreases by an approximate factor of 4 with little to no drop in the performance.

Optionally, embodiments of the present invention can include a general or specific purpose computer or distributed system programmed with computer software implementing steps described above, which computer software may be in any appropriate computer language, including but not limited to C++, FORTRAN, BASIC, Java, Python, Linux, assembly language, microcode, distributed programming languages, etc. The apparatus may also include a plurality of such computers/distributed systems (e.g., connected over the Internet and/or one or more intranets) in a variety of hardware implementations. For example, data processing can be performed by an appropriately programmed microprocessor, computing cloud, Application Specific Integrated Circuit (ASIC), Field Programmable Gate Array (FPGA), or the like, in conjunction with appropriate memory, network, and bus elements. One or more processors and/or microcontrollers can operate via instructions of the computer code and the software is preferably stored on one or more tangible non-transitive memory-storage devices.

Although the invention has been discussed in the foregoing with reference to an exemplary embodiment of the architecture of the invention, the invention is not restricted to this particular embodiment which can be varied in many ways without departing from the invention. The discussed exemplary embodiment shall therefore not be used to construe the appended claims strictly in accordance therewith. On the contrary the embodiment is merely intended to explain the wording of the appended claims without intent to limit the claims to this exemplary embodiment. The scope of protection of the invention shall therefore be construed in accordance with the appended claims only, wherein a possible ambiguity in the wording of the claims shall be resolved using this exemplary embodiment.

Note that this application refers to a number of publications. Discussion of such publications herein is given for more complete background and is not to be construed as an admission that such publications are prior art for patentability determination purposes.

Embodiments of the present invention can include every combination of features that are disclosed herein independently from each other. Although the invention has been described in detail with particular reference to the disclosed embodiments, other embodiments can achieve the same results. Variations and modifications of the present invention will be obvious to those skilled in the art and it is intended to cover in the appended claims all such modifications and equivalents. The entire disclosures of all references, applications, patents, and publications cited above are hereby incorporated by reference. Unless specifically stated as being "essential" above, none of the various components or the interrelationship thereof are essential to the operation of the invention. Rather, desirable results can be achieved by substituting various components and/or reconfiguration of their relationships with one another.

The References Cited herein Refer to the Following:

[1] Badrinarayanan, V., Kendall, A., and Cipolla, R. (2017). Segnet: A deep convolutional encoder-decoder architecture for image segmentation. IEEE transactions on pattern analysis and machine intelligence, 39(12):2481-2495.

[2] Chao, P., Kao, C.-Y., Ruan, Y.-S., Huang, C.-H., and Lin, Y.-L. (2019). Hardnet: A low memory traffic network. In Proceedings of the IEEE International Conference on Computer Vision, pages 3552-3561.

[3] Chen, L.-C., Papandreou, G., Kokkinos, I., Murphy, K., and Yuille, A. L. (2014). Semantic image segmentation with deep convolutional nets and fully connected crfs. arXiv preprint arXiv:1412.7062.

[4] Chen, L.-C., Papandreou, G., Kokkinos, I., Murphy, K., and Yuille, A. L. (2017a). Deeplab: Semantic image segmentation with deep convolutional nets, atrous convolution, and fully connected crfs. IEEE transactions on pattern analysis and machine intelligence, 40(4):834-848.

[5] Chen, L.-C., Papandreou, G., Schroff, F., and Adam, H. (2017b). Rethinking atrous convolution for semantic image segmentation.

[6] Chen, L.-C., Zhu, Y., Papandreou, G., Schroff, F., and Adam, H. (2018). Encoder-decoder with atrous separable convolution for semantic image segmentation. In ECCV.

[7] Ding, H., Jiang, X., Shuai, B., Qun Liu, A., and Wang, G. (2018). Context contrasted feature and gated multi-scale aggregation for scene segmentation. In Proceedings of the IEEE Conference on Computer Vision and Pattern Recognition, pages 2393-2402.

[8] Fu, J., Liu, J., Tian, H., Li, Y., Bao, Y., Fang, Z., and Lu, H. (2019a). Dual attention network for scene segmentation. In Proceedings of the IEEE Conference on Computer Vision and Pattern Recognition, pages 3146-3154.

[9] Fu, J., Liu, J., Wang, Y., Zhou, J., Wang, C., and Lu, H. (2019b). Stacked deconvolutional network for semantic segmentation. IEEE Transactions on Image Processing.

[10] Girshick, R. (2015). Fast r-cnn. In Proceedings of the IEEE international conference on computer vision, pages 1440-1448.

[11] He, K., Zhang, X., Ren, S., and Sun, J. (2016a). Deep residual learning for image recognition. In Proceedings of the IEEE conference on computer vision and pattern recognition, pages 770-778.

[12] He, K., Zhang, X., Ren, S., and Sun, J. (2016b). Deep residual learning for image recognition. 2016 IEEE Conference on Computer Vision and Pattern Recognition (CVPR).

[13] Krizhevsky, A., Sutskever, I., and Hinton, G. E. (2012). Imagenet classification with deep convolutional neural networks. In Advances in neural information processing systems, pages 1097-1105.

[14] Lan, X., Zhu, X., and Gong, S. (2018). Person search by multi-scale matching. In Proceedings of the European Conference on Computer Vision (ECCV), pages 536-552.

[15] Li, J., Raventos, A., Bhargava, A., Tagawa, T., and Gaidon, A. (2018). Learning to fuse things and stuff. 10 A PREPRINT-Nov. 19, 2019

[16] Li, W., Zhu, X., and Gong, S. (2017). Person reidentification by deep joint learning of multi-loss classification. arXiv preprint arXiv:1705.04724.

[17] Long, J., Shelhamer, E., and Darrell, T. (2015). Fully convolutional networks for semantic segmentation. In Proceedings of the IEEE conference on computer vision and pattern recognition, pages 3431-3440.

[18] Milioto, A., Lottes, P., and Stachniss, C. (2018). Real-time semantic segmentation of crop and weed for precision agriculture robots leveraging background knowledge in cnns. In 2018 IEEE International Conference on Robotics and Automation (ICRA), pages 2229-2235. IEEE.

[19] Paszke, A., Chaurasia, A., Kim, S., and Culurciello, E. (2016). Enet: A deep neural network architecture for real-time semantic segmentation. arXiv preprint arXiv:1606.02147.

[20] Pohlen, T., Hermans, A., Mathias, M., and Leibe, B. (2017). Full-resolution residual networks for semantic segmentation in street scenes. 2017 IEEE Conference on Computer Vision and Pattern Recognition (CVPR).

[21] Poudel, R. P., Liwicki, S., and Cipolla, R. (2019a). Fast-scnn: fast semantic segmentation network. arXiv preprint arXiv:1902.04502.

[22] Poudel, R. P., Liwicki, S., and Cipolla, R. (2019b). Fast-scnn: fast semantic segmentation network. arXiv preprint arXiv:1902.04502.

[23] Ronneberger, O., Fischer, P., and Brox, T. (2015). U-net: Convolutional networks for biomedical image segmentation. In International Conference on Medical image computing and computer-assisted intervention, pages 234-241. Springer.

[24] Salehi, S. S. M., Hashemi, S. R., Velasco-Annis, C., Ouaalam, A., Estroff, J. A., Erdogmus, D., Warfield, S. K., and Gholipour, A. (2018). Real-time automatic fetal brain extraction in fetal mri by deep learning. In 2018 IEEE 15th International Symposium on Biomedical Imaging (ISBI 2018), pages 720-724. IEEE.

[25] Simonyan, K. and Zisserman, A. (2014). Very deep convolutional networks for large-scale image recognition. arXiv preprint arXiv:1409.1556.

[26] Su, Y.-H., Huang, K., and Hannaford, B. (2018). Real-time vision-based surgical tool segmentation with robot kinematics prior. In 2018 International Symposium on Medical Robotics (ISMR), pages 1-6. IEEE.

[27] Sun, K., Zhao, Y., Jiang, B., Cheng, T., Xiao, B., Liu, D., Mu, Y., Wang, X., Liu, W., and Wang, J. (2019). High-resolution representations for labeling pixels and regions. CoRR, abs/1904.04514.

[28] Sun, S., Pang, J., Shi, J., Yi, S., and Ouyang, W. (2018). Fishnet: A versatile backbone for image, region, and pixel level prediction. In Advances in Neural Information Processing Systems, pages 754-764.

[29] Szegedy, C., Liu, W., Jia, Y., Sermanet, P., Reed, S., Anguelov, D., Erhan, D., Vanhoucke, V., and Rabinovich, A. (2015). Going deeper with convolutions. In Proceedings of the IEEE conference on computer vision and pattern recognition, pages 1-9.

[30] Wang, X., Girshick, R., Gupta, A., and He, K. (2018). Non-local neural networks. In Proceedings of the IEEE Conference on Computer Vision and Pattern Recognition, pages 7794-7803.

[31] Yu, C., Wang, J., Peng, C., Gao, C., Yu, G., and Sang, N. (2018). Bisenet: Bilateral segmentation network for real-time semantic segmentation. Lecture Notes in Computer Science, page 334-349.

[32] Yuan, Y. and Wang, J. (2018). Ocnet: Object context network for scene parsing. arXiv preprint arXiv:1809.00916. A PREPRINT-Nov. 19, 2019

[33] Zhao, H., Qi, X., Shen, X., Shi, J., and Jia, J. (2018a). Icnet for real-time semantic segmentation on high-resolution images. In Proceedings of the European Conference on Computer Vision (ECCV), pages 405-420.

[34] Zhao, H., Shi, J., Qi, X., Wang, X., and Jia, J. (2017). Pyramid scene parsing network. 2017 IEEE Conference on Computer Vision and Pattern Recognition (CVPR).

[35] Zhao, H., Zhang, Y., Liu, S., Shi, J., Change Loy, C., Lin, D., and Jia, J. (2018b). Psanet: Point-wise spatial attention network for scene parsing. In Proceedings of the European Conference on Computer Vision (ECCV), pages 267-283.

[36] Zhu, Y., Sapra, K., Reda, F. A., Shih, K. J., Newsam, S., Tao, A., and Catanzaro, B. (2018). Improving semantic segmentation via video propagation and label relaxation.

[37] Zhuang, J. and Yang, J. (2018). Shelfnet for real-time semantic segmentation. arXiv preprint arXiv:1811.11254.

[38] Wu, Z., Shen, C., and van den Hengel, A. (2019). Wider or deeper: Revisiting the resnet model for visual recognition. Pattern Recognition, 90:119-133.

What is claimed is:

1. A computer-implemented semantic segmentation architecture comprising an asymmetric encoder-decoder structure, wherein the asymmetric architecture is enhanced by comprising further an adapter for linking different stages of the encoder and the decoder, wherein the adapter aggregates features from three different levels and intermediates between encoder and decoder, such that the adapter aggregates the information from two different levels of the encoder and one level of the decoder.

2. The semantic segmentation architecture of claim 1, wherein the adapter amalgamates information from both the encoder and the decoder for preserving and refining information between multiple levels of the encoder and decoder, representing different levels of abstraction.

3. The semantic segmentation architecture of claim 1, wherein the adapter has the function $$x^a_s = D(T(x^e_{s-1})) + T(x^e_s) + U(x^d_{s+1})$$

where superscripts a, e, and d denote adaptor, encoder, and decoder respectively, s represents the spatial level in the network, $D(:)$ and $U(:)$ are downsampling and upsampling functions, and $T(:)$ is a transfer function that reduces the number of output channels from an encoder block and transfers them to the adaptor.

* * * * *